Nov. 1, 1932.  C. C. BRADBURY  1,885,580
BRAKE MECHANISM
Filed Sept. 3, 1929  7 Sheets-Sheet 1

Fig.1

Inventor:
Clifford C. Bradbury
By Williams, Bradbury, McCaleb & Hinkle
Attys.

Nov. 1, 1932.  C. C. BRADBURY  1,885,580
BRAKE MECHANISM
Filed Sept. 3, 1929  7 Sheets-Sheet 2

Nov. 1, 1932.  C. C. BRADBURY  1,885,580
BRAKE MECHANISM
Filed Sept. 3, 1929   7 Sheets-Sheet 3

Inventor
Clifford C. Bradbury
By Williams, Bradbury, McCaleb & Hinkle
Attys.

Patented Nov. 1, 1932

1,885,580

UNITED STATES PATENT OFFICE

CLIFFORD C. BRADBURY, OF GLENCOE, ILLINOIS, ASSIGNOR TO HYDRAULIC BRAKE COMPANY, OF LOS ANGELES, CALIFORNIA, A CORPORATION OF CALIFORNIA

BRAKE MECHANISM

Application filed September 3, 1929. Serial No. 389,901.

This invention relates to a brake system and more particularly to a safety device for a brake system.

In the operation of the brakes of a motor vehicle there is a possibility that the operator may apply too great a force upon the brake lever, which may result in the breaking or bending of some of the parts in a mechanical brake system, and in the case of a hydraulic brake system it may in addition cause an excessive pressure, which may damage the system. On the other hand, there is a possibility that the pedal for applying the brakes may be completely depressed, striking the floor board of the vehicle, without producing sufficient pressure to apply the brakes. This is due to the fact that the wear of the brake lining of the brake shoes is gradual, requiring further and further depression of the brake pedal until it becomes necessary to apply the brakes quite suddenly in an emergency when it may be found that the pedal is completely depressed without sufficiently applying the brakes.

An object of the invention is to provide an improved safety device for a brake system.

A further object is to provide a safety device in a brake system which will prevent the possibility of an excessive as well as an insufficient pressure in the system.

A further object is to provide an auxiliary cylinder in connection with the master cylinder which is adapted to absorb excess pressures and under certain conditions to release fluid into the system to produce a greater pressure.

A further object of the invention is to provide a safety device for a brake system in which energy may be stored during the normal operation of the device, which may be released under abnormal conditions.

Referring to the drawings in which the same reference characters indicate the same parts in the several views, the apparatus comprises, in general, a fluid reservoir 8, a master cylinder 9, wheel brake cylinders 11, which are connected to the master cylinder through tubes 12 and a safety appliance 13.

Figure 1:
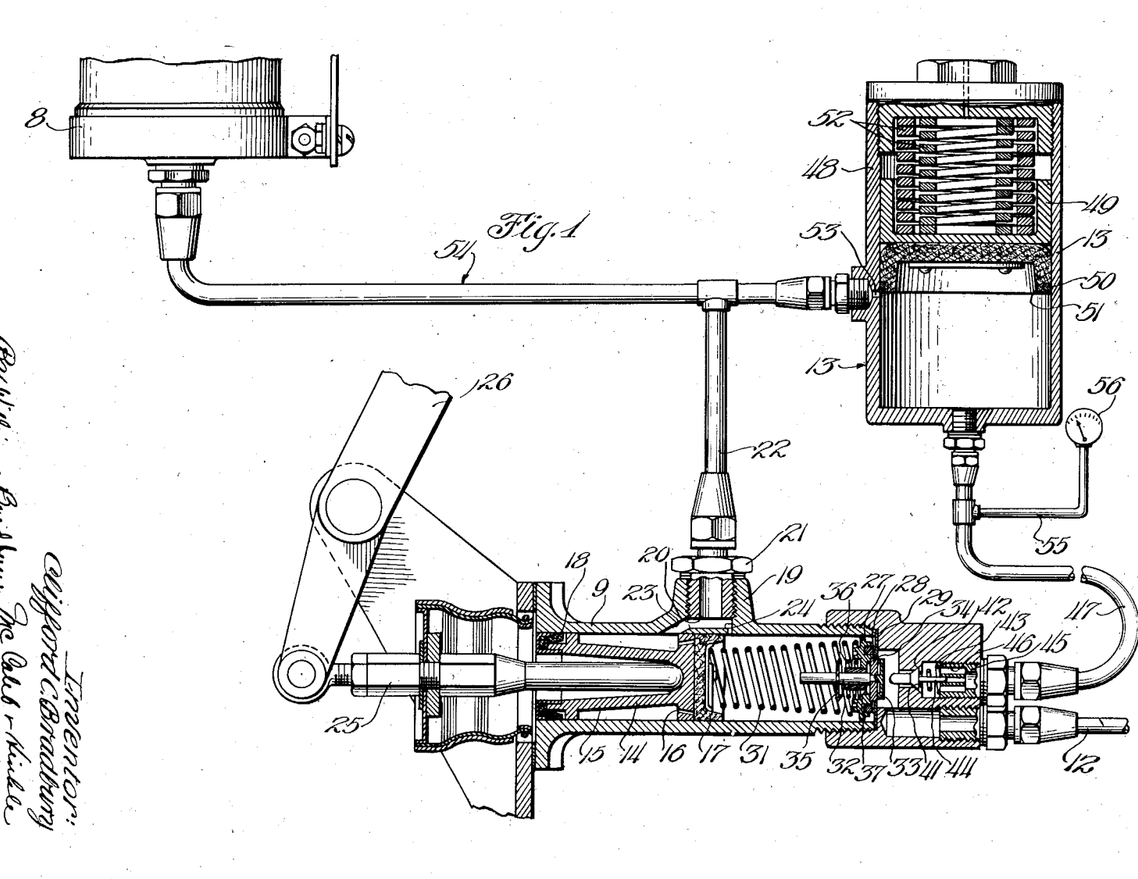
Fig. 1 is a side elevation, partly in section, of a fluid supply reservoir and master cylinder assembly embodying the invention.
Figure 2:
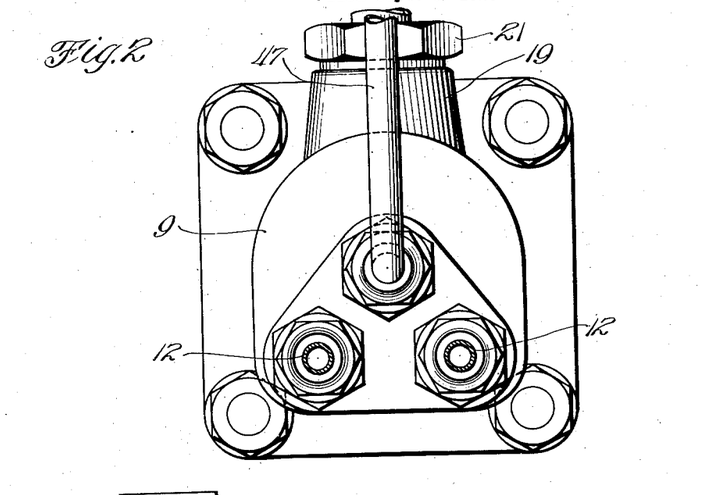
Fig. 2 is an end view of the master cylinder.
Figure 3:
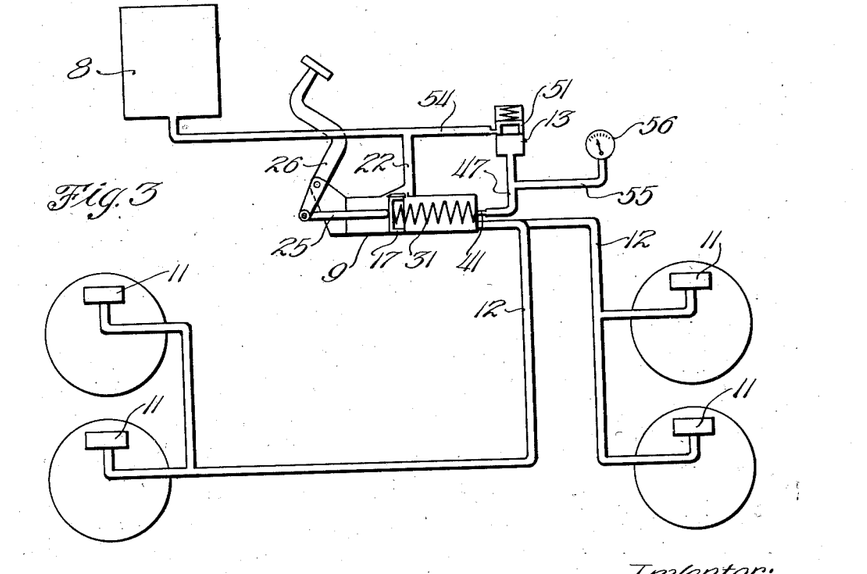
Fig. 3 is a schematic view of a hydraulic brake system embodying the invention.

The master cylinder has a piston 14 reciprocable therein which is provided with a deep annular recess 15. The face of the piston is provided with a plurality of passages 16 near its periphery which connect the annular recess with the space in the front of the piston. A packing cup 17 is seated against the face of the piston and normally closes passages 16 and a packing ring 18 surrounds the piston rearwardly of the annular recess.

The upper side of cylinder 9 is provided with an internally threaded boss 19 adapted to receive a bored plug 21 forming a chamber 20 in the boss which connects through the plug with a tube 22, leading to the supply reservoir. The upper wall of the cylinder is provided with a passage 23 which connects the annular recess through chamber 20 to the fluid reservoir. The length of the annular recess is such that it will be in communication with duct 23 in all positions of the piston.

A second duct 24 in the upper wall of the cylinder is located immediately in front of the retracted position of the piston and connects the master cylinder to the fluid reservoir only when the piston is in its retracted position.

The piston may be moved forwardly by an adjustable rod 25 which extends into a deep pocket formed in the piston. Rod 25 is connected to a foot pedal 26 for actuating the piston and applying the brakes.

Figure 4:
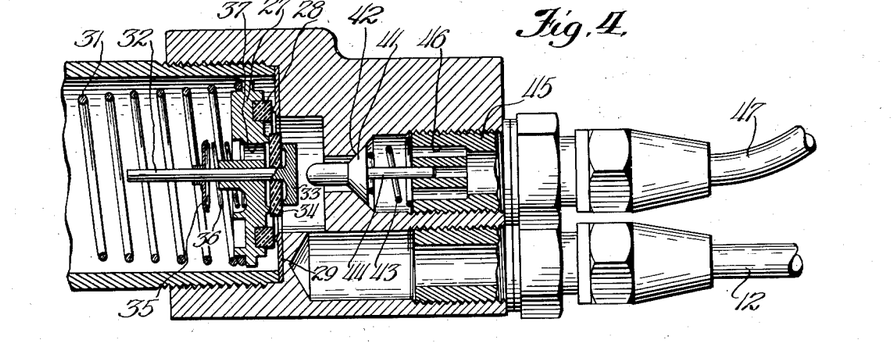
Fig. 4 is an enlarged fragmentary section of the end of the master cylinder showing the valve arrangement in the cylinder.

Located in the forward end of cylinder 9, as clearly illustrated in Fig. 4, is a double valve consisting of a large return check valve and a discharge valve carried by the return valve. The return valve comprises an annular disc 27 provided with an annular packing ring 28 which is seated against an annular ridge formed in a disc 29 rigidly supported in the forward part of the cylinder. The disc 27 is normally held against its seat by a spring 31 which also serves to return the piston to its retracted position. Disc 27 carries centrally a smaller discharge valve and is provided with a central aperture through which a valve stem 32 extends. The valve stem carries on one side of disc 27 a disc 33 to which a packing member 34 is attached. On the opposite side of disc 27 the valve stem is provided with a disc 35 against which a spring 36 abuts and serves to urge the central discharge valve to its closed position. A plurality of passages 37 are provided through the disc 27 which allow the fluid from cylinder to unseat valve 33 and pass therethrough to the tubes 12 leading to the wheel brake cylinders. When the pedal is depressed piston 14 moves forwardly, closing duct 24 and producing a fluid pressure in the cylinder which causes the fluid to pass through the valve mechanism just described, to apply the brakes. Upon the release of the pedal, spring 31 will tend to return the piston to its retracted position and at the same time it will tend to retain the disc 27 against its seat to retard the return of the fluid to the cylinder. Thus a slight pressure will be maintained in the wheel brake cylinders and its connections due to the fact that the return of the fluid to the cylinder is retarded by the valve mechanism.

The retraction of the piston together with the retardation of the fluid returning to the cylinder produces a low pressure in the cylinder which results in fluid from the recess 15 which is at atmospheric pressure passing through passages 16, unseating the periphery of packing cup 17, and flowing into the cylinder. After the piston has returned to its retracted position fluid will continue to return from the wheel brake cylinders through the retarding return valve providing an excess of fluid in the master cylinder which escapes from the master cylinder through duct 24 and returns to the supply reservoir.

It sometimes happens that the operator of a vehicle exerts too great a pressure upon the pedal, which may in some instances be great enough to bend some of the mechanical interconnected parts or rupture the connections in the fluid system. In order to overcome this difficulty, a valve 41 is provided in the forward part of the cylinder. Valve 41 is held against the valve seat 42 by means of a compression spring 43. The valve 41 is provided with a stem 44 which fits into a circular aperture in a plug 45. When the pressure in the master cylinder becomes too great, the fluid pressure will unseat valve 41 and allow the fluid to pass through a plurality of passages 46 in plug 45 leading to tube 47 into the safety appliance 13.

The safety appliance comprises a cylinder 48 having a reciprocable piston 49 therein. The face of the piston is provided with a packing cup 51 and the piston is constantly urged in a downward direction by compression springs 52. The two springs are provided as a measure of safety so that in case one of the springs is broken enough pressure to operate the brakes will still be available. The forward edge of the packing cup preferably carries a split ring 50 to support the lateral wall of the packing cup and prevent the edge of the packing cup from being forced into aperture 53 by the pressure of the fluid in the cylinder. Fluid from the master cylinder coming through tube 47 enters cylinder 48 and raises the piston 49, storing fluid under pressure therein until the piston reaches a point where it uncovers aperture 53 in the side of the cylinder which communicates with a tube 54 leading to the supply reservoir. When the piston 49 reaches this point, spring 52 will not be farther compressed but the excess liquid will be returned to the supply reservoir through aperture 53. The fluid in cylinder 48 will not return to the master cylinder when the master piston is retracted since valve 41 closes as soon as the pressure in the master cylinder is reduced.

In order to indicate to the operator that the pressure in cylinder 13 is getting low and that the brakes need adjustment, a tube 55 is provided in connection with tube 47 and leads to a suitable indicating device 56 which may be mounted on the dash board in convenient view of the operator.

In the normal operation of the apparatus the safety appliance 13 will be idle. In case, however, that the operator in the application of the brakes applies a greater pressure to the pedal than is necessary, thereby tending to produce excessive pressure in the system and in the master cylinder, liquid will flow into cylinder 48, and liquid under pressure will thus accumulate in this cylinder. Any liquid expelled from the liquid system through passage 53 will be compensated for by the return of the master piston to its retracted position which provides an excess of fluid in the system each time that it is retracted, so that repeated expulsion of liquid from the system through passage 53 will not affect the normal amount of fluid in the system.

In operating a motor vehicle, the wear of the lining on the brake shoes requires a further and further depression of the brake pedal in order to apply the brakes, until the pedal finally strikes the floor board of the vehicle. It may happen that in an emergency the pedal is depressed to the floor board without sufficiently applying the brakes. This difficulty is overcome in the present invention by extending the valve stem 32 rearwardly so that when the pedal is depressed to such an extent as to nearly strike the floor board, the piston 14 will come in contact with the valve stem 32 and move it forwardly to depress valve 41 and cause this valve to open. When the valve 41 opens, the reserve fluid stored in cylinder 48 is forced back into the master cylinder by the spring 52 to provide the additional pressure to apply the brakes.

The invention thus provides a simple and effective mechanism for preventing either low or excessive pressures in the brake system and at the same time indicates the need for adjustment of the brakes.

Figure 6:
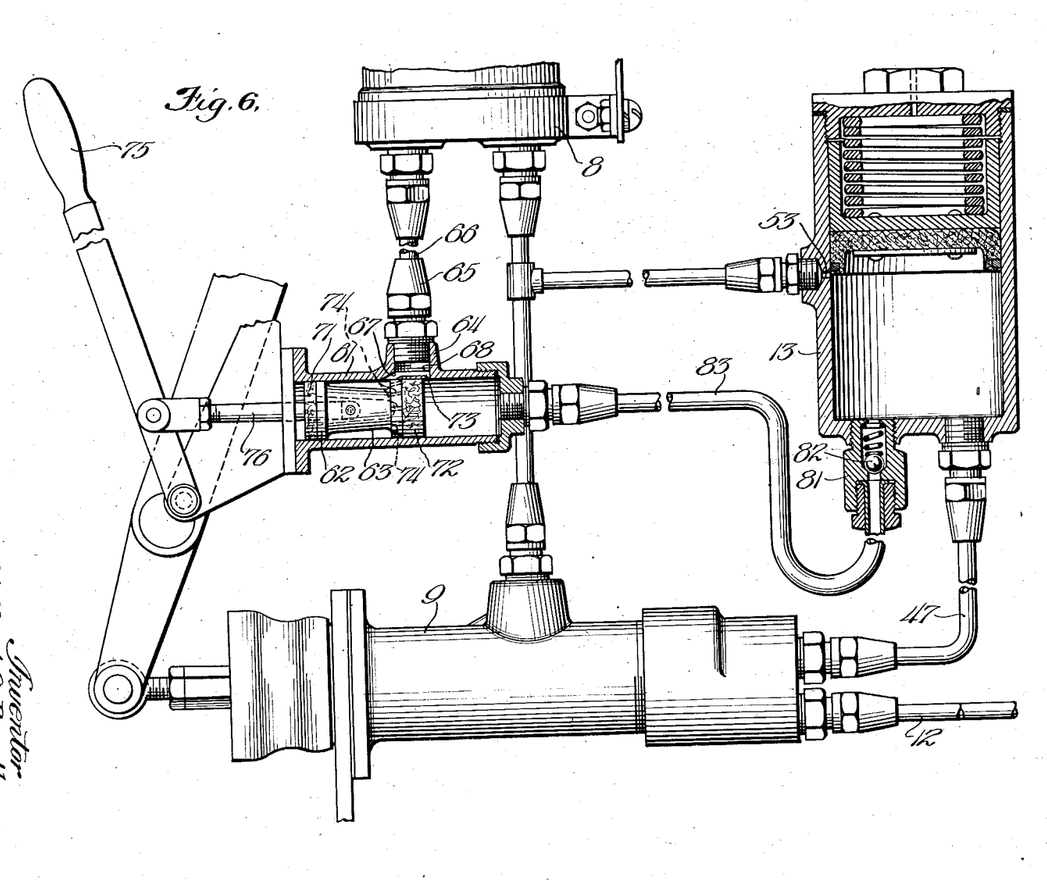
Fig. 6 is a side elevation, partly in section, of a modified form of the invention.

Fig. 6 illustrates an embodiment of a modified form of the invention comprising a fluid supply reservoir 8, master cylinder 9 and safety device 13. This device also embodies means for replenishing the supply of liquid in the safety device 13.

As the brake linings of the brakes become worn more and more, a further and further depression of the foot pedal becomes necessary until eventually in an emergency the pedal may be depressed to such an extent as to strike the floor board of the vehicle. Before this can happen in the present apparatus, the end of the piston will strike valve stem 32 and cause it to actuate valve 41 to supply additional fluid under pressure to the system. This causes a decrease in the amount of liquid in the cylinder of the safety device and after the brakes have been applied several times by using fluid from the cylinder of the safety device, the device will no longer be effective unless the brakes are adjusted to operate with a shorter piston stroke. In order to overcome this difficulty and cause the safety device to be effective until it is convenient to adjust the brakes, a cylinder 61 is provided for replenishing fluid in the cylinder of the safety device. Cylinder 61 is provided with a piston 62 having a deep annular recess 63. The cylinder is provided with a boss 64 provided with a plug 65 which communicates with the fluid supply through a tube 66. Recess 63 is connected by a passage 67 to a chamber 68 under the plug which is in communication with the fluid reservoir. Thus fluid from the reservoir will enter the recess and form a fluid seal about the piston.

The rear end of the piston is provided with a packing ring 71, and the front face of the piston is provided with a packing cup 72. Immediately in front of the retracted position of the piston is an aperture 73 communicating with chamber 68. The face of the piston is provided with a plurality of passages 74 which are normally closed by the packing cup 72. The piston may be reciprocated by a hand lever 75 connected to the piston by an adjustable link 76, the forward end of which is pivotally attached to the piston.

The forward end of the cylinder is connected to the safety device through a tube 83 which is attached to the safety device by a plug 81 having a ball type valve therein. Upon the forward movement of handle 75 piston 62 will be moved forwardly forcing the fluid from cylinder 61 through tube 83 into the cylinder of the safety device. Upon the rearward movement of handle 75 piston 62 will be retracted. The fluid in the cylinder of the safety device is prevented from returning to cylinder 61 by valve 82, causing a low pressure in cylinder 61 forwardly of the piston. The low pressure in cylinder 61 causes fluid to be drawn from recess 63 of the piston through the passages 74 in the face of the piston unseating packing cup 62 and allowing the fluid to enter the cylinder. The fluid in recess 63 is replaced as quickly as it is withdrawn therefrom by fluid from the fluid reservoir 8. In this manner the fluid pressure in the safety device may be maintained at its maximum value at all times. There is no danger of pumping too much fluid into the safety device because as soon as the piston in the safety device clears aperture 58 the excess fluid will be returned to the fluid reservoir.

Figure 7:
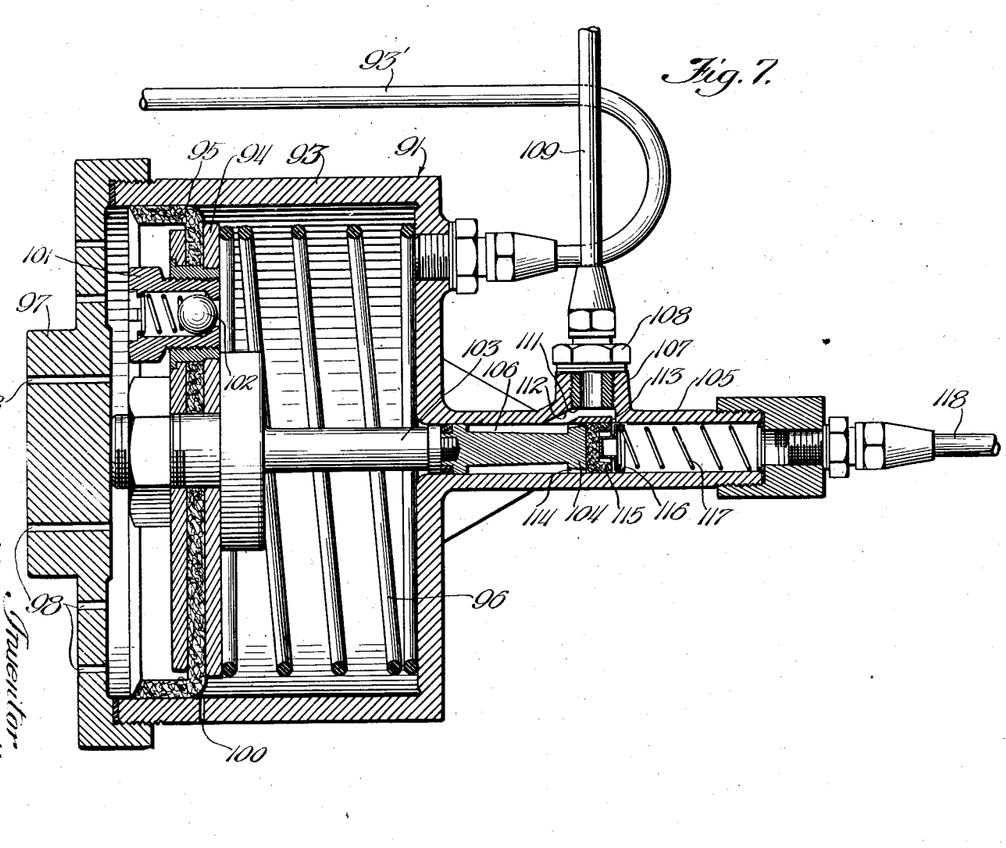
Fig. 7 is an enlarged sectional view of a cylinder adapted to be actuated by manifold pressure of a vehicle.
Figure 8:
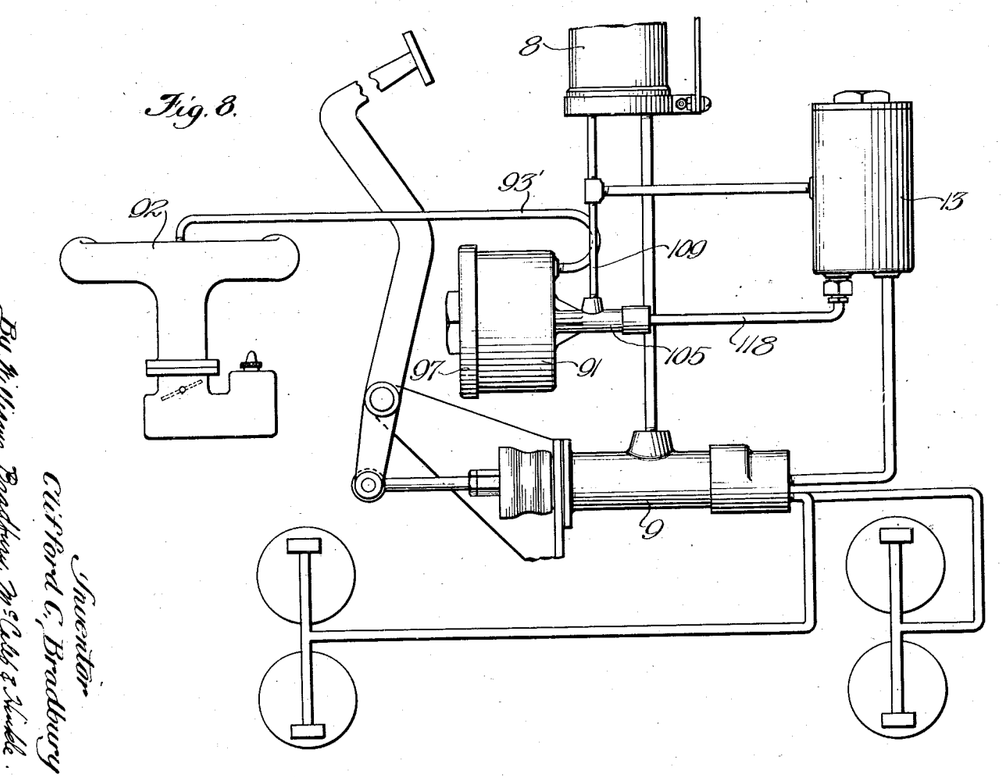
Fig. 8 is a side elevation of a modified form of the invention embodying the cylinder showing in Fig. 7.

Figure 8 illustrates another embodiment of the invention having a fluid reservoir 8, master cylinder 9, a safety device 13, similar to that illustrated in Fig. 1. In this embodiment the fluid pressure in the safety device is maintained by a pressure mechanism 91 operated by the manifold 92 of the motor of the vehicle. When the motor of a vehicle is in operation, a low pressure is created in the manifold and the pressure varies with different conditions of operation of the vehicle. This fact is taken advantage of in the operation of mechanism 91 which comprises a cylinder 93 connected to the manifold by a tube 93′. The cylinder is provided with a piston 94 having a packing cup 95 secured thereto. Interposed between the piston 94 and the front wall of the cylinder is a spring 96 for normally retaining the piston in the position shown in Fig. 7. As the suction in the manifold varies, the piston will be drawn forward and allowed to retract within the cylinder. In order to permit the piston to move freely within the cylinder, cylinder head 97 is provided with a plurality of air vents 98 connecting the space rearwardly of the piston with the atmosphere. The cylinder is protected against back fire pressure from the manifold by providing the piston with a plug 101 having a valve 102 therein which will open upon a predetermined pressure within the cylinder and allow the air or gas within the cylinder to escape. A small aperture 100 is provided in the lower cylinder wall to allow fluid and condensed gases to drain from the cylinder.

Extending forwardly from the piston is a piston rod 103 which is connected to a second piston 104 reciprocally mounted in cylinder 105. Piston 104 is provided with an annular recess 106. The upper wall of the cylinder is provided with a boss 107 into which a plug 108 is threaded, connecting a tube 109 leading to the fluid supply reservoir to a fluid chamber 111 formed within the boss. Recess 106 is in communication through passage 112 with the chamber 111. Immediately in front of the retracted position of the piston 104 is an aperture 113 connecting the cylinder with chamber 111, while the piston is in its retracted position. Piston 104 is provided with a plurality of passages 114 which are normally covered by packing cup 115. The packing cup is retained upon the face of the piston by a cup-shaped washer 116 and a spring 117. The forward end of the cylinder is connected by a tube 118 to the safety device 13. The operation of this embodiment of the invention is as follows:

As the suction of the manifold varies in accordance with the speed of the motor, or upon the starting and stopping of the motor, piston 94 will be reciprocated within its cylinder causing a corresponding movement of piston 104. As the piston 104 moves forwardly in cylinder 105, pressure will be built up within this cylinder causing fluid to be transmitted to the cylinder of the safety device. Upon the retraction of this piston, the low pressure within the cylinder will cause fluid from recess 106 to pass into cylinder 105 which will be replenished by fluid from the main fluid reservoir. In this manner a frequent replenishing of the fluid in the safety device takes place and any excess fluid in the safety device will be returned to the main fluid supply reservoir. The ratio of piston 94 to piston 104 is such that relatively low pressure of the manifold will be strong enough to maintain the desired pressure in the safety device.

Figure 9:
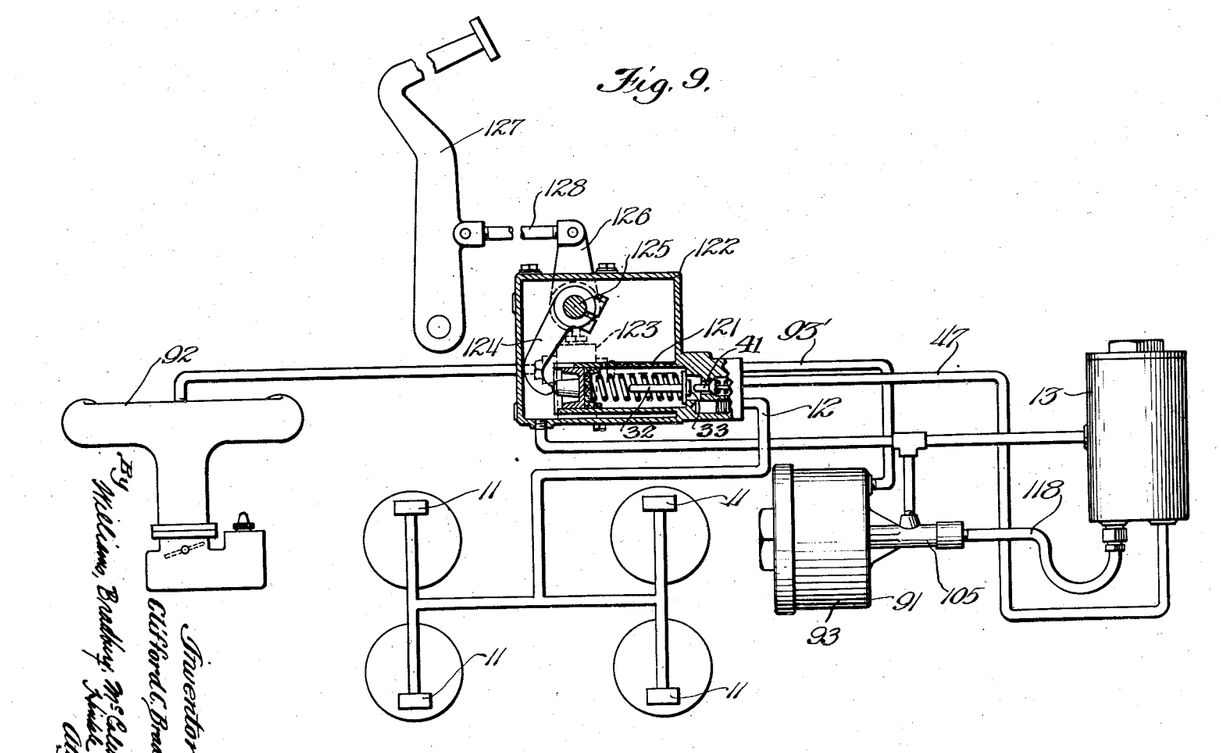
Fig. 9 is a side elevation, partly in section, of a modified form of the invention embodying the valve shown in Fig. 5 and the cylinder of Fig. 7.

Figure 9 illustrates another modified form of the invention. In this embodiment of the invention a master cylinder 121 of the submerged type is shown mounted within the fluid reservoir 122. The chief distinction of this embodiment of the invention over that shown in Fig. 8 is that a valve mechanism 123 is interposed between manifold 92 and the pressure mechanism 91.

The piston of the master cylinder is actuated by an arm 124 mounted upon a shaft 125 extending through the side wall of the fluid reservoir 122. On the outside of the fluid reservoir an arm 126 is mounted on shaft 125 which is connected to the foot pedal 127 by means of a link 128. Mounted upon shaft 125 is a cam 126' which is circular for the major part of its periphery having a depressed portion 127' on its lower side. Cam 126' is adapted to co-operate with valve stem 128' to connect the cylinder of the pressure mechanism 91 to the manifold each time the brake is applied and interrupting this connection when the brake is released and connecting pressure mechanism 91 to the atmosphere. Valve mechanism 123 is provided with two valve seats 131 and 132. Valve stem 128' carries a double valve head 133 which may be seated either against valve seat 131 or valve seat 132.

Figure 5:
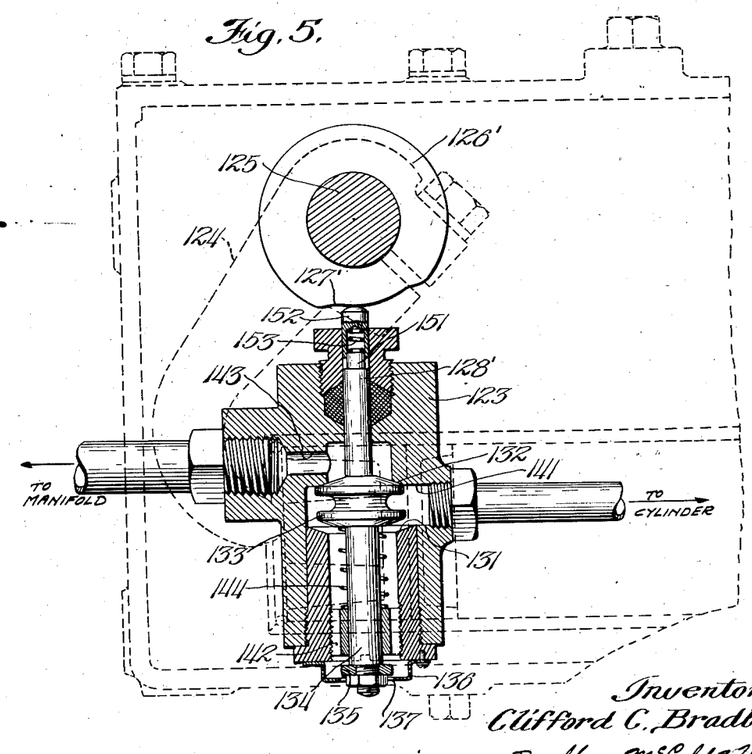
Fig. 5 is an enlarged sectional view of a valve used in a modified form of the invention illustrated in Fig. 9.

Extending downward from double valve head is a valve stem 134 carrying an enlarged washer 135 at its lower end. A cap 136 having an aperture 137 of such a size as to receive the washer 135 is placed over the lower end of the valve stem. In the upper position of the valve head, as shown in Fig. 5, the cylinder of the pressure mechanism 91 will be connected through port 141, passages 142 and aperture 137 to the atmosphere. Upon the rotation of cam 126' in the application of the brake valve head 133 will be moved to its lower valve seat 131 connecting the cylinder of the pressure mechanism 91 through port 141 and port 143 to the manifold of the engine, causing the piston of pressure mechanism 91 to move forwardly and supply fluid to the cylinder of the safety device. The purpose of cap 136 and washer 135 is to prevent the manifold from being connected to the atmosphere through ports 142 during the time that valve 133 moves from its upper valve seat to its lower valve seat. Thus a slight movement of valve head 133 will result in closing the ports 142 to atmosphere. Upon the release of the brake mechanism, valve 133 will return to its upper position allowing air to enter through aperture 137, apertures 142 and port 141 into the cylinder of the pressure mechanism thereby allowing the piston of the pressure mechanism to retract in readiness for a subsequent application of the brakes.

In order to obviate the necessity of accurately machining the surface of cam 126' valve stem 128' is provided with a reduced portion 151 over which a cap 152 is placed. Interposed between the cap and the valve stem is a spring 153. Spring 153 is made stronger than the spring 144 which serves to return the valve head to its upper position. Thus the spring 153 will not be flexed upon a rotation of cam 126 until the valve head 133 strikes valve seat 131. The valve mechanism in the forward end of the master cylinder 121 is the same as that illustrated in Fig. 4 and includes the valves 27 and 33 and 41 and are shown more or less diagrammatically in Fig. 9. During the normal operation of the system the valve mechanism which includes the valves 27 and 32 function to permit liquid under pressure to pass into the system and return upon the release of the brake mechanism as already described. The valve 41 in the forward end of the master cylinder 121 also operates in the manner already described to relieve excessive liquid pressure due to the application of greater pedal pressure than is necessary and permits this pressure to be conducted to the safety device 13. The excessive pressure which is conducted to the safety device under such condition is only incidental as the pressure mechanism 91, in combination with the cylinder 105, generates the pressure for the safety device 13 upon each application of the brakes. At such times as the brake pedal is operated by the application of greater pedal pressure than is necessary the excessive pressure from the master cylinder 121 is conducted through the tube 47, and the fluid from the cylinder 105 is conducted through the tube 18. It is thus apparent that only a such times as the master cylinder develops an excessive pressure, which is due to causes already pointed out, is fluid from the master cylinder conducted to the safety device.

The valve stem 32 of the valve 33 cooperates with the piston in the master cylinder and is of such length that during the normal operation of the brake pedal the piston in its forward movement does not engage the stem 32 but as the lining of the brake shoes wears, a further and further depression of the brake pedal is required in order to apply the brakes. At a predetermined point in the forward travel of the piston, it will engage the valve stem 32 and move it forwardly to depress the valve 41. As the valve 41 opens, the reserve fluid stored in the cylinder of the safety device 13 is forced back into the master cylinder to provide the additional pressure to apply the brakes. Thus it is apparent that the pressure mechanism 91, in combination with the cylinder 105, serves to replenish the fluid in the safety device 13 upon each application of the brakes, so that even though the brake lining may be badly worn in the brakes, there will always be sufficient fluid pressure available in the safety device 13 with a predetermined movement of the piston in the cylinder 121, to make it impossible for the pedal to strike the floor board without properly applying the brakes.

What I claim is new and desire to secure by Letters Patent of the United States is:

1. In a hydraulic brake system, a master cylinder, a piston in the master cylinder, means for actuating the piston to cause a pressure in the system, means associated with the system to prevent an excessive pressure, and other means for connection with said system, said associated means effective when the piston actuating means has moved a predetermined distance to connect said other means to said system for increasing the pressure therein.

2. In a hydraulic brake system, means for producing a fluid pressure in the system, means for actuating said means, means for preventing excessive pressure in the system, means for storing energy by the operation of the actuating means, said pressure preventing means effective to release said energy for increasing the pressure in the system when the actuating means has moved a predetermined distance.

3. A hydraulic brake system including a master cylinder, a piston in the master cylinder, means for actuating the piston in the master cylinder to produce a pressure in the system, an auxiliary cylinder connected to the system, a piston in the auxiliary cylinder, a resilient means for exerting a pressure on the piston in the auxiliary cylinder, means for rendering the pressure on the auxiliary piston ineffective to produce a pressure in the system under normal conditions, and means for causing said pressure to produce a pressure in the system under abnormal conditions.

4. A hydraulic brake system including means for producing a pressure in the system, an auxiliary cylinder associated therewith, a piston in the auxiliary cylinder, a spring for normally urging the piston in a direction to produce a pressure in the system and allowing the piston to recede under pressure, means for normally restraining the forward movement of the piston, and means allowing additional forward movement of the piston under predetermined conditions.

5. A hydraulic brake system including pressure means for producing a pressure in the system, a cylinder associated with the pressure means, a piston within said cylinder, resilient means for urging the piston forward in the cylinder, said piston being depressed by fluid from the pressure means, means for limiting the depression of the piston, and means responsive to the movement of the pressure producing means for releasing the piston to produce an additional pressure in the system.

6. A hydraulic brake system including a master cylinder, a piston therein for producing a pressure in the system, an auxiliary cylinder, a piston in the auxiliary cylinder, a resilient means urging the auxiliary piston forward in the cylinder, a fluid connection and a valve in said connection allowing pressure in the master cylinder to be communicated to auxiliary cylinder, said valve being opened when the piston in the master cylinder has moved a predetermined distance, allowing the pressure in the auxiliary cylinder to be communicated to the master cylinder.

7. A hydraulic brake system including a master cylinder, a piston movable therein, an auxiliary cylinder, a piston for the auxiliary cylinder, means for urging the auxiliary piston forward in the cylinder, a fluid connection between the master and auxiliary cylinders, a valve in said fluid connection allowing fluid pressure of the master cylinder to be communicated to the auxiliary cylinder, said auxiliary cylinder having an aperture in its wall limiting the pressure therein, and means for operating the valve to allow pressure in the auxiliary cylinder to be communicated to the master cylinder.

8. In a hydraulic brake system, a fluid container, a master cylinder adapted to be supplied with fluid therefrom, a piston in said cylinder for producing a pressure in the system, an auxiliary cylinder, a piston in the auxiliary cylinder, a spring urging the piston of the auxiliary cylinder forward in the cylinder, a fluid connection between the master and auxiliary cylinders, a valve allowing the pressure in the master cylinder to be communicated to the auxiliary cylinder, said auxiliary cylinder having an aperture allowing fluid from the auxiliary cylinder to return to the fluid container when the pressure exceeds a given value, and means for causing the operation of the valve in the fluid connection to allow the pressure in the auxiliary cylinder to be communicated to the system to increase the pressure in the system.

9. In a hydraulic brake system, a pressure means for producing a fluid pressure in the system, a pedal for actuating said pressure means, an auxiliary cylinder, a piston in the auxiliary cylinder, means for communicating a pressure from the master cylinder to the auxiliary cylinder, and means responsive to a predetermined movement of the pedal for communicating a fluid pressure from the auxiliary cylinder to the system.

10. In a brake system, a plurality of brakes, manually operable means for applying the brakes, means for storing energy by the operation of said manually operable means, and means for releasing said stored energy under predetermined conditions to apply the brakes.

11. In a brake system, a plurality of brakes, manually operable means for applying the brakes and means for preventing an excessive pressure on the brakes, other means for connection with said system, said first means effective under predetermined conditions to connect said other means to said system to increase the pressure on the brakes.

12. In a brake system, a brake mechanism, means for operating said brake mechanism, means effective upon the operation of said operating means to store energy and means effective to release said energy responsive to said operating means for increasing the effectiveness of said brake mechanism under abnormal conditions.

13. In a brake system, a master cylinder and a piston therein for producing a fluid pressure, a pedal for actuating said piston, means for storing a reserve fluid pressure, means affected by movement of said pedal for releasing said reserve fluid pressure into the fluid system under predetermined conditions, and means for replenishing the reserve fluid pressure.

14. In a hydraulic brake system for a motor vehicle, a master cylinder for producing a fluid pressure in the system, means for relieving excess pressure in the system, a safety device for providing a reserve supply of fluid under pressure, and means operable by manifold suction of the motor of the vehicle for replenishing the reserve supply.

15. In a hydraulic brake system for a motor vehicle, a master cylinder, a piston in the master cylinder, means for actuating the piston to produce a fluid pressure in the system, a reserve fluid pressure means for maintaining a supply of fluid under pressure, and means for replenishing said supply upon each actuation of the piston.

16. In a hydraulic brake system for a motor vehicle, a master cylinder, a piston movable therein to produce a fluid pressure in the system, a reserve cylinder for containing fluid under pressure, a manifold pressure operated cylinder having a piston therein, and a cylinder for supplying liquid to the reserve cylinder having a piston therein actuated by the piston of the manifold pressure operated cylinder, whereby the fluid is replenished in the reserve cylinder.

17. In a hydraulic brake system for a motor vehicle, a master cylinder, a piston movable therein to produce a fluid pressure in the system, means for actuating the piston, a reserve cylinder for supplying fluid to the system upon a predetermined movement of the piston in the master cylinder, a pressure mechanism for maintaining a fluid supply in the reserve cylinder, and a valve for connecting the pressure mechanism to the manifold of the motor upon each actuation of the piston of the master cylinder.

In witness whereof, I hereunto subscribe my name this 30th day of August, 1929.

CLIFFORD C. BRADBURY.